Nov. 1, 1955

M. C. SHAW ET AL 2,722,463

HYDRODYNAMIC BEARING

Filed Jan. 4, 1952

INVENTORS

Milton C Shaw
Charles D. Strang Jr

Nov. 1, 1955 M. C. SHAW ET AL 2,722,463
HYDRODYNAMIC BEARING
Filed Jan. 4, 1952 3 Sheets-Sheet 2

INVENTORS
Milton C Shaw
Charles D. Strang Jr.

Nov. 1, 1955　　　　M. C. SHAW ET AL　　　2,722,463
HYDRODYNAMIC BEARING
Filed Jan. 4, 1952　　　　　　　　　　　　3 Sheets-Sheet 3
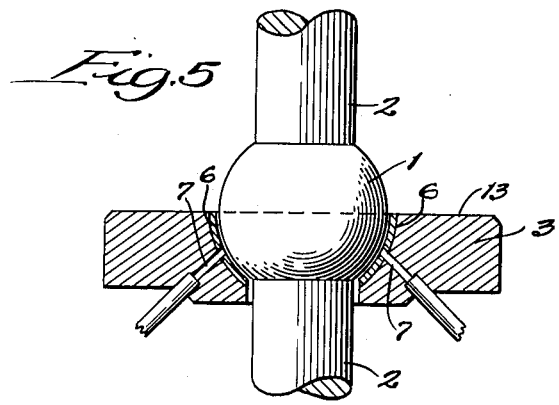
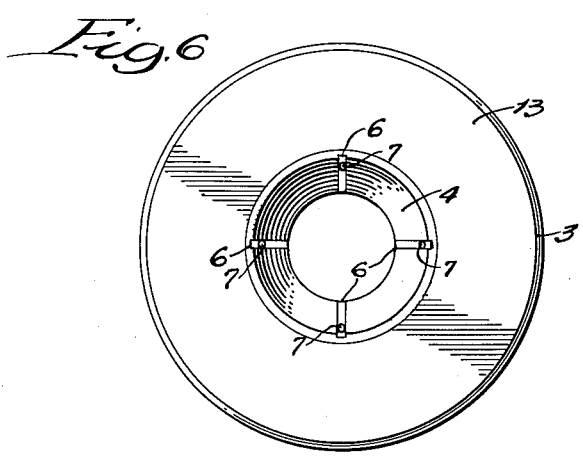
INVENTORS:
Milton C. Shaw and
Charles D. Strang Jr.,
BY Dawson & Coms,
ATTORNEYS.

United States Patent Office 2,722,463
Patented Nov. 1, 1955

2,722,463

HYDRODYNAMIC BEARING

Milton C. Shaw, Lexington, Mass., and Charles D. Strang, Jr., Oshkosh, Wis.

Application January 4, 1952, Serial No. 264,995

6 Claims. (Cl. 308—9)

This invention relates to bearings and more specifically to hydrodynamically lubricated thrust bearings.

In general, an object of this invention is to provide a bearing assembly in which the load-supporting or bearing surfaces consist of portions of solids of revolution having a hydrodynamic oil film therebetween during rotation of the surface of one bearing element relative to the other.

Another object is to provide a thrust bearing of the type described in which operation is effected without being subject to radial eccentricity.

A further object is to produce a self-aligning spherical thrust or radial thrust bearing of the type described which is simple in construction and of long life in operation.

A still further object is to produce a bearing of the type described which operates satisfactorily when lubricated by a pressure oil feed or when operated in an oil bath using hydrodynamic pressures developed in operation to induce the flow of lubricant or oil into the region between the bearing surfaces.

A still further object is to produce a thrust bearing capable of use while being rotated in either direction.

These and other objects and advantages of this invention will hereinafter appear and for purposes of illustration, but not of limitation, embodiments are shown in the accompanying drawings, in which—

Figure 5 is a sectional elevational view showing modification in a hydrodynamic spherical bearing of the type shown in Figures 1, 2 and 4 but with a shaft extending from both ends of the bearing element.

Figure 6 is a top plane view of the bearing surface in the modification shown in Figure 5.

It has been common practice to employ bearings which make use of a wedge-shaped oil film in the direction of relative motion between the bearing surfaces. Such a wedge-shaped oil film is common to all familiar hydrodynamic bearings as in the ordinary journal bearing, the Kingsbury or Michell type of thrust bearing, the so-called fixed pad thrust bearing, or modifications of any of these forms. It is the common belief that bearing surfaces which are parallel in the direction of relative motion are incapable of hydrodynamically supporting a unit load which is in excess of the oil supply pressure.

While non-hydrodynamic spherical bearings have been employed for many years, their use has been limited to relatively low speed applications inasmuch as their load capacity varies inversely with the speed. The hydrodynamic theory of lubrication which requires a wedge-shaped oil film in the direction of relative motion between the bearing surfaces has dictated against the use of these bearings under conditions of fluid lubrication in which the load capacity varies directly with journal speed. Spherical surfaces have been extensively used for purposes of bearing alignment by mounting the bearing upon a spherical seat external of the bearing proper. However, few attempts have been made to use hydrodynamic bearing surfaces themselves as media for alignment, as in the practice of this invention.

Figure 2:
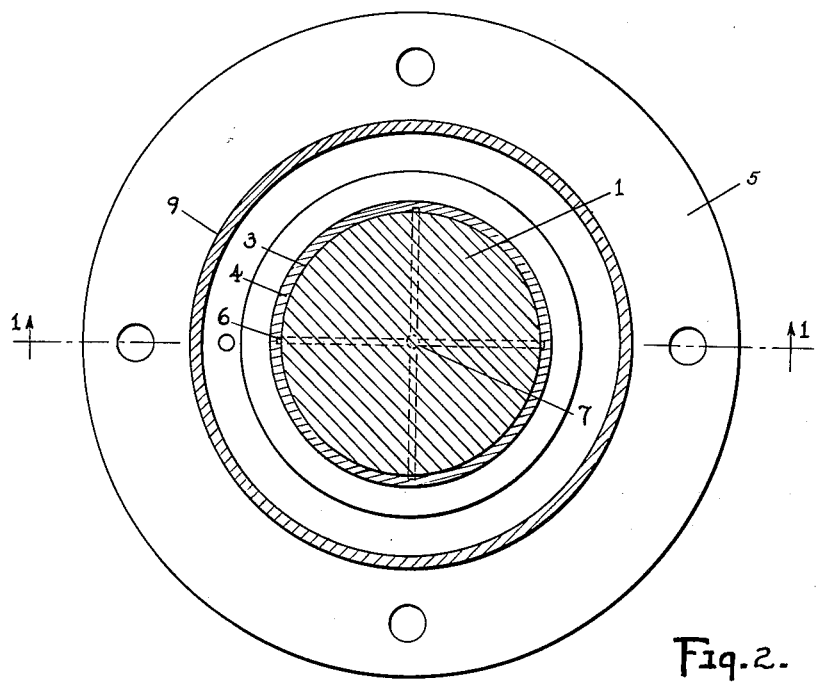
Figure 2 is a sectional view taken substantially along the line 2—2 of Figure 1.
Figure 1:
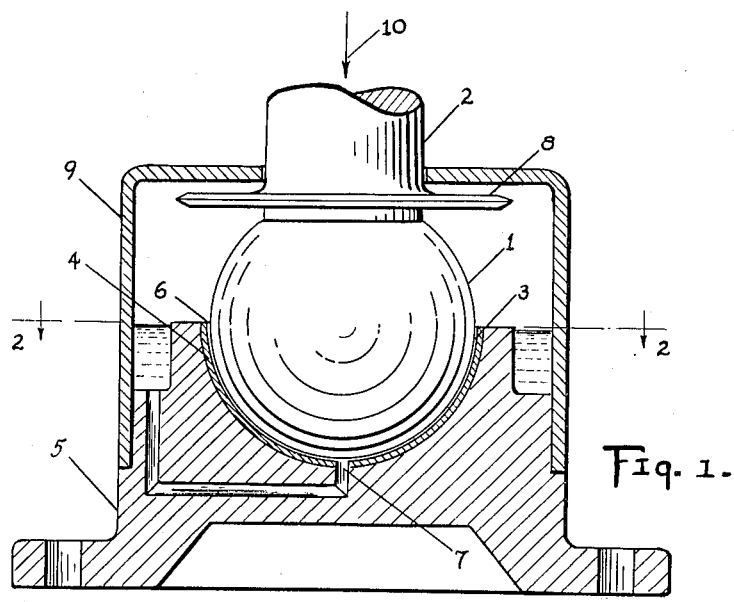
Figure 1 is a sectional elevational view of a bearing assembly embodying features of this invention.
Figure 4:
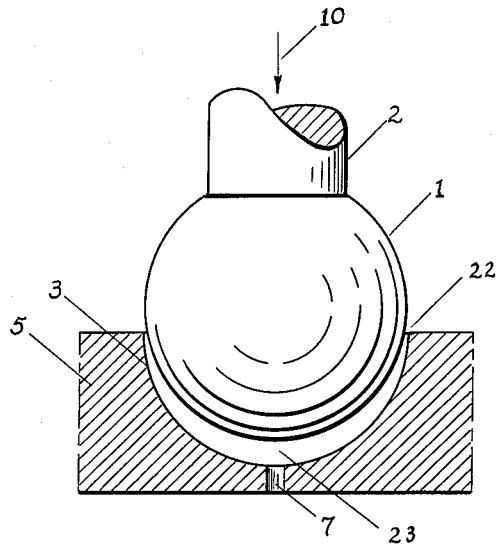
Figure 4 is a diagrammatic view partially in section in which the position of parts during operation are exaggerated for purposes of illustration.
Figure 3:
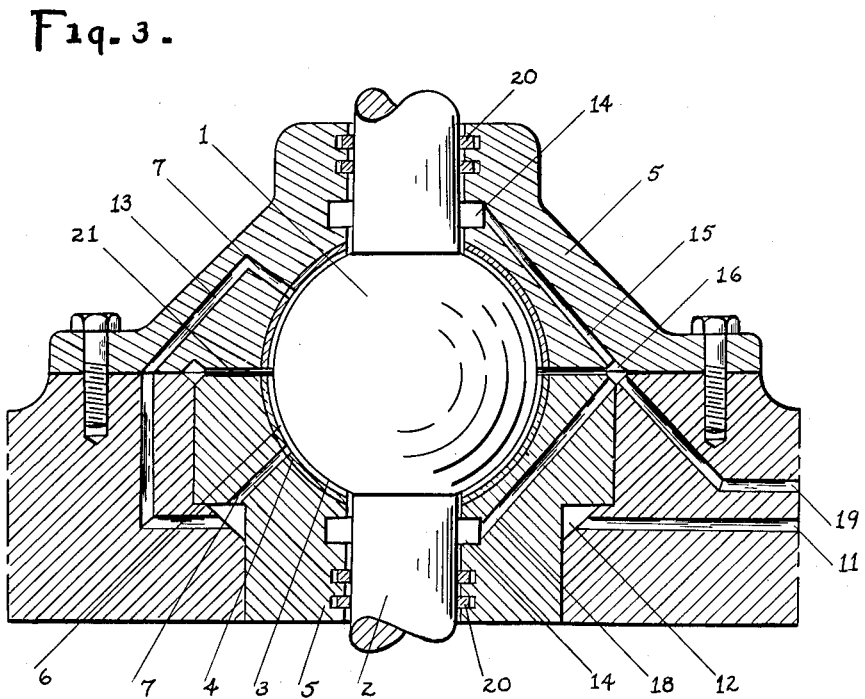
Figure 3 is a sectional elevational view taken through the center of a hydrodynamic spherical bearing assembly as employed in a duplex arrangement wherein a combined thrust-radial load may be supported in either axial direction.

In the accompanying drawings, in which like numerals of reference indicate similar parts throughout, 1 is the spherically shaped journal element fixed onto one end of the shaft 2, as shown in Figures 1, 2 and 4, or onto an intermediate portion of the shaft, as shown in Figures 3, 5 and 6.

The bearing 3 in which the spherical journal element operates is of spherical shape dimensioned as closely as possible to conform to the curvature of the spherical element so that when in interfitted relation there is for all practical purposes no clearance between surfaces. This conforming relation is adapted to exist in the journal element from the great circle taken in a plane perpendicular to the axis of rotation of the bearing element. In the event that the spherical element is located on the end of the shaft 2, as in Figures 1, 2 and 4, the journal is adapted to conform through a hemispherical section or an angle of 180° substantially equidistantly divided between each side of the axis of rotation. As will hereinafter be pointed out, a thin layer 4 of bearing metal is preferably provided to line the bearing journal in the support 3 to form the bearing surface.

Lubricant is introduced through inlets 7 to one or more grooves 6 which preferably are formed to extend radially through the bearing surface but may be formed of spiral shape so long as the groove or grooves communicate with the entire surface of the journal element during rotation about its axis.

Oil or other lubricant is fed through the grooves either by hydrodynamically developed pressure, as in the case of a bath oil unit shown in Figures 1 and 2, or by the oil supply pressure, as in the case of a pressure feed unit of the type illustrated in Figure 3. In Figure 1, illustration is made of an oil slinger 8 used in combination with a cap 9 to minimize escape of oil from the top of the assembly. The direction of the applied thrust load in Figures 1, 2, 5 and 6 is indicated by the force vector 10.

In the duplex unit shown in Figure 3, the spherical journal element 1 is located within an intermediate portion of shaft 2. A pair of journal housings of the type described, each of which commences with an opening corresponding to the great circle taken along a plane perpendicular to the axis of rotation, are joined together by bolt members or the like to provide the duplex arrangement in which the journal element 1 is completely confined except that the conforming spherical sections are separated by a space sufficient to permit slight axial movement of the bearing element in operation for purposes which will hereinafter be described. The lubricant in the duplex unit is introduced under pressure through passage 11 to the circumferential gallery 12 from which it passes to the radial oil grooves 6 by way of passages 7 and 13. Oil or lubricant leaving the bearing is collected in grooves 14 and is scavenged through passages 15, 16, and 18 which conduct the oil or lubricant to a return line 19. The lubricant is prevented from leaving the bearing housing 5 along shaft 2 by seals 20 positioned at each end. The lubricant leaving the central portion of the bearing passes through annular clearance space 21 and into the circumferential collector gallery 16.

Considering the action of this apparatus, when the journal element is rotated about the common axis relative to the bearing element, a hydrodynamic film of oil is carried on the surfaces of the bearing from the groove or grooves 6 to provide a lubricating film therebetween. As a result thereof, the bearing element and journal become separated axially by an amount corresponding to the thickness of the lubricating film to produce a clearance space having a crescent shape which is highly exaggerated in Figure 4. Actually, the clearance, which is greatest at the base, is incapable of accurate measurement but is believed to be less than 0.001 inch, while the resulting clearance at the major diameter is but a smaller fraction thereof and of such negligible dimension as to provide a substantial oil seal.

Under a thrust load, the oil film in the bearing takes the form of a solid of revolution to the end that there is relatively no wedge-shaped oil film in the direction of rotation. Classical hydrodynamic theory indicates that such a bearing is incapable of carrying a unit load in excess of the oil supply pressure. However, numerous experiments have shown that a fitted spherical bearing of the type described and claimed herein is fully hydrodynamic. It has been found that the co-efficient of friction decreases with load when all other operating variables are maintained substantially constant. This observation, together with the relatively small friction torque values obtained, is sufficient to establish the existence of hydrodynamic lubrication.

Conventional bearings operating with an oil wedge in the direction of relative motion between the bearing elements assume a given film shape for a particular value of the quantity $$\frac{ZN}{P}$$

(where Z is the absolute viscosity of the lubricant in centipoise, N is the speed of the journal in R. P. M. and P is the unit load on the bearing) regardless of the individual values of Z, N and P comprising this quantity. However, the performance of the fitted spherical bearing is dependent upon the individual values of Z, N and P rather than upon the composite quantity $$\frac{ZN}{P}$$

The theoretically unexpected load capacity of a fitted spherical bearing is due largely to inertia forces developed in the oil film. A particle of lubricant at any point in the film is subjected to centripetal, angular, Coriolis supplementary compound and radial acceleration components. The resultant acceleration acting upon an oil particle of finite density gives rise to a pressure at that point, this pressure being accentuated by the geometry of the crescent shaped oil film.

The desired spherical surfaces wherein practically no clearance exists between the bearing surfaces when in their assembled relation can be secured economically and expediently by placing a steel ball into a roughly machined socket or cavity coated with the bearing material which is extruded therefrom to form the bearing surface while the extruded portion is thereafter removed. Many other methods of fabrication may be used to obtain the same end result. For a spherical bearing the region most sensitive to change in contour lies in the vicinity of the maximum diameter, or the great circle 22 in Figure 4, whereas discrepancies in the contour of the surfaces in the polar region of the bearing, 23 in Figure 4, are relatively unimportant. In fact, the entire polar region may be eliminated, as in the bearing of Figure 3 or in the bearing of Figures 5 and 6, without destroying the hydrodynamic action of this bearing.

It is important that the amount of the polar region removed to enable the shaft extending from the journal element to pass therethrough should not be greater than an angle of 45° in either direction from the axis. In other words, the spherical section extending downwardly from the great circle of the journal element should correspond to an angle of 45° or more so as to provide sufficient bearing surface and reacts with the bearing surfaces of the journal and lubricant therebetween to impart the desired action.

As used herein, the term "oil" or "lubricant" are employed in a broad sense to comprehend any fluid suitable to bring about the action herein described. The particular physical properties of major interest in a fluid of the type used for practice in this invention are absolute viscosity and specific gravity.

While it may be highly advisable to employ spherical surfaces in a bearing of the type described in view of the accompanying feature of internal self-alignment, it is believed that our invention is capable of being used with elements having surfaces comprising portions of any solid of revolution.

It has been found advisable to employ a multiplicity of radial oil grooves in order to lubricate and cool the bearing properly. The number of oil grooves to be used depends upon the size and conditions under which the bearing is to operate. In one series of tests the optimum number of grooves was found to lie between 4 and 8.

In addition to a pure thrust load, actual tests have shown a fitted spherical thrust bearing capable of supporting a combined thrust-radial load, the radial load component being as high as 50 per cent of the maximum allowable thrust load.

By way of example the following operating data obtained from a unit essentially the same as that shown in Figure 1 is cited. The diameter of the journal (sphere) was in this case 0.750 inch and the bearing was fitted with four radial grooves extending from the pole of the bearing to its major diameter. The bronze bearing block was lined with a layer of bearing metal consisting of 50 per cent tin and 50 per cent lead. This bearing was constructed by the aforementioned pressing technique. Lubricating oil having a viscosity of 1.45 centipoises at the operating temperature was introduced at the polar point on the bearing surface under a pressure of 6 pounds per square inch. The following data were observed:

| Journal speed, R. P. M. | Total load, lbs. | Unit load, lbs./sq. in. | Coefficient of friction |
|---|---|---|---|
| 700 | 105 | 268 | 0.0140 |
| 1,400 | 220 | 559 | 0.0061 |
| 2,475 | 350 | 892 | 0.0055 |

The foregoing values of unit load are based upon the projected area of the bearing less the projected area of the oil grooves. The co-efficient of friction is based upon an assumed effective journal radius equal to 85 per cent of the actual journal radius. It is evident that this bearing was completely hydrodynamic and its performance is seen to be comparable to that of the conventional wedge type bearing.

The bearings herein described may be very advantageously designed into particularly compact units capable of hydrodynamically supporting very high unit bearing pressures with relatively little frictional loss at ultra high speeds. Such a device is ideally suited as the thrust bearing in an aircraft compressor-turbine power plant.

This application is a continuation-in-part of application Ser. No. 661,156, filed on April 10, 1946, and now abandoned.

While we have described our invention in detail in its present preferred embodiment, it will be obvious to those skilled in the art, after understanding our invention, that various changes and modifications may be made therein without departing from the spirit or scope thereof as defined in the appended claims.

We claim:
1. In a hydrodynamic bearing, a shaft rotatable on its axis, a journal on said shaft having a spherical surface with an axis of the sphere being the same as that of the shaft, a bearing in the form of a substantially perfect hemispherical section of the same dimension as the journal to receive the journal in fitting relation without clearance between the surfaces when the bearing assembly is stationary and with the axis of the shaft and the journal being perpendicular to the plane of the great circle formed by the hemisphere, and means for introducing lubricant between the surfaces during rotation whereby the journal and bearing move bodily relative to each other solely in the axial direction.

2. In a hydrodynamic bearing, a shaft rotatable about its axis, a journal on said shaft having a spherical surface with an axis of the sphere being the same as that of the shaft, a bearing of the same dimension as the journal to receive the journal in fitting relation without clearance between the surfaces up to the equator of the journal perpendicular to the axis of rotation of the shaft when the bearing assembly is stationary, and means for introducing lubricant under pressure between the surfaces during rotation whereby relative axial movement occurs between the journal and bearing to form a wedge shaped oil film, the thickest part of which is in the polar region.

3. In a hydrodynamic bearing, a shaft rotatable on its axis, a journal integral with the shaft having a spherical surface with an axis of the journal being the same as the axis of the shaft, a bearing in the form of a hemispherical section of the same dimension as the journal to receive the journal therein in fitting relation without clearance between surfaces when the bearing assembly is stationary and with the axis of the journal and shaft aligned with the bearing radius passing through the polar region, and means for introducing lubricant under pressure to the adjacent surfaces of the journal and bearing during relative rotational movement whereby a wedge shaped lubricant layer is formed between the surfaces of the journal and bearing during operation, the thickest part of which is in the polar region.

4. A hydrodynamic bearing as claimed in claim 3 in which the polar region of the bearing is cut away by an amount less than 45° for passage of the shaft therethrough.

5. A hydrodynamic bearing as claimed in claim 3 in which the means for introducing lubricant to the adjacent surfaces comprises radial grooves in one of the surfaces of the journal and the bearing extending from a point nearest the polar region substantially to the edge of the hemispherical section.

6. In a hydrodynamic bearing, a shaft rotatable on its axis, a journal on said shaft having a spherical surface with the axis of the sphere being the same as that of the shaft, a pair of bearing members each of which is in the form of a hemispherical section of the same dimension as the journal to receive the journal in fitting relation without clearance between the surfaces up to the equator of the journal perpendicular to the axis of rotation of the shaft when the bearing assembly is stationary and having openings in the polar regions dimensioned to correspond to the dimension of the shaft for enabling the shaft to extend therethrough, said bearing members being arranged with the equatorial regions parallel to and adjacent to each other about the journal with the shaft extending axially through the openings in the polar regions, and means for introducing lubricant between the surfaces during rotation whereby the journal and bearing move bodily relative to each other solely in the axial direction, said bearing members being spaced apart from each other between the equatorial regions by a distance at least equal to the amount of relative axial movement.

References Cited in the file of this patent

UNITED STATES PATENTS

| | | |
|---|---|---|
| 688,138 | Themel | Dec. 3, 1901 |
| 2,016,716 | Henry | Oct. 8, 1935 |
| 2,342,055 | Laboulais | Feb. 15, 1944 |

FOREIGN PATENTS

| | | |
|---|---|---|
| 609,292 | Germany | Feb. 12, 1935 |